(12) United States Patent
Takeda

(10) Patent No.: US 10,941,854 B2
(45) Date of Patent: Mar. 9, 2021

(54) OPERATING DEVICE

(71) Applicant: ALPS ALPINE CO., LTD., Tokyo (JP)

(72) Inventor: Yu Takeda, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/783,346

(22) Filed: Feb. 6, 2020

(65) Prior Publication Data
US 2020/0173540 A1 Jun. 4, 2020

Related U.S. Application Data

(63) Continuation of application No. PCT/JP2018/016638, filed on Apr. 24, 2018.

(30) Foreign Application Priority Data

Sep. 8, 2017 (JP) .............................. JP2017-173470

(51) Int. Cl.
*F16H 59/10* (2006.01)
*G05G 5/03* (2008.04)
(Continued)

(52) U.S. Cl.
CPC .............. *F16H 59/10* (2013.01); *G05G 5/03* (2013.01); *G05G 5/05* (2013.01); *F16H 2059/0269* (2013.01)

(58) Field of Classification Search
CPC ...... F16H 59/02; F16H 59/0278; F16H 59/10; F16H 2059/026; F16H 2059/0269;
(Continued)

(56) References Cited

U.S. PATENT DOCUMENTS 5,389,865 A * 2/1995 Jacobus ................. B25J 9/1689
318/568.1
8,336,418 B2 12/2012 Giefer et al.
(Continued)

FOREIGN PATENT DOCUMENTS

JP 2008-302816 12/2008
JP 2010-522115 7/2010
(Continued)

OTHER PUBLICATIONS

International Search Report for PCT/JP2018/016638 dated Jul. 17, 2018.

*Primary Examiner* — Richard W Ridley
*Assistant Examiner* — Brian J McGovern
(74) *Attorney, Agent, or Firm* — IPUSA, PLLC

(57) ABSTRACT

An operating device includes a shaft operated to tilt, a contact section on the shaft in a biased state movable and tiltable integrally with the shaft, a first holding section generating a feeling of moderation by sliding against and holding the contact section at tilted positions the shaft, and a second holding section contacting the contact section, guiding the contact section to a predetermined position from the tilted positions, and holding the contact section at the predetermined position. The first holding section is movable between first and second positions. The contact section contacts the first holding section and is separated from the second holding section when the first holding section is at the first position. The contact section is separated from the first holding section and contacts the second holding section when the first holding section is at the second position.

13 Claims, 12 Drawing Sheets

(51) Int. Cl.
*G05G 5/05* (2006.01)
*F16H 59/02* (2006.01)

(58) Field of Classification Search
CPC ............. F16H 2059/0278; F16H 61/24; F16H 2061/241; F16H 2061/242; F16H 2061/243; G05G 5/05; G05G 5/03; G05G 5/06; B60K 20/02
See application file for complete search history.

(56) References Cited

U.S. PATENT DOCUMENTS

| | | | |
|---|---|---|---|
| 10,711,881 B2* | 7/2020 | Hessel | F16H 61/22 |
| 2006/0185467 A1* | 8/2006 | Giefer | B60Q 1/1469 |
| | | | 74/532 |
| 2010/0257970 A1* | 10/2010 | Giefer | F16H 61/22 |
| | | | 74/473.21 |
| 2010/0307276 A1* | 12/2010 | Giefer | F16H 61/24 |
| | | | 74/473.3 |
| 2016/0123460 A1* | 5/2016 | Tsukazaki | F16H 59/0204 |
| | | | 74/473.23 |
| 2016/0131246 A1* | 5/2016 | Park | F16H 59/10 |
| | | | 74/473.12 |
| 2017/0059034 A1* | 3/2017 | Makimura | F16H 59/0278 |
| 2018/0348808 A1* | 12/2018 | Mizukami | F16H 59/10 |
| 2018/0363766 A1* | 12/2018 | Hong | F16H 59/044 |
| 2020/0174513 A1* | 6/2020 | Takeda | F16H 59/10 |

FOREIGN PATENT DOCUMENTS

| | | |
|---|---|---|
| JP | 2016-088498 | 5/2016 |
| JP | 2017-095041 | 6/2017 |

\* cited by examiner

OPERATING DEVICE

CROSS-REFERENCE TO RELATED APPLICATIONS

This application is a continuation application of International Application No. PCT/JP2018/016638 filed on Apr. 24, 2018 and designated the U.S., which is based upon and claims priority to Japanese Patent Application No. 2017-173470 filed on Sep. 8, 2017, the entire contents of which are incorporated herein by reference.

BACKGROUND OF THE INVENTION

1. Field of the Invention

Embodiments discussed herein are related to an operating device.

2. Description of the Related Art

Conventionally, as operating devices having a tiltable operating lever that is held at a plurality of positions, there is a known operating device that automatically returns the operating lever to a predetermined position. As such an operating device, an automatic transmission has been proposed that automatically returns the operating lever (or select lever) to the predetermined position (or parking lock position) after an ignition key is pulled out or the like, for example.

An example of a conventional operating device is described in Japanese National Publication of International Patent Application No. 2010-522115, for example.

In the conventional operating device, the operating lever is returned to the predetermined position by directly pushing a shaft of the operating lever. For this reason, when the pushed position of the operating lever and a center of the tilt of the operating lever are close to each other, there was a problem in that a large dynamic force is required to return the operating lever.

SUMMARY OF THE INVENTION

One object of the embodiments is to reduce the dynamic force required to return the operating lever.

According to one aspect of the embodiments, an operating device includes a shaft operated to tilt; a contact section, held on the shaft in a biased state movable in a predetermined direction, and tiltable integrally with the shaft operated to tilt; a first holding section, configured to generate a feeling of moderation by sliding against the contact section, and including a plurality of recesses that hold the contact section at positions to where the shaft is operated to tilt; and a second holding section configured to make contact with the contact section, guide the contact section to a predetermined position from the positions to where the shaft is operated to tilt, and hold the contact section at the predetermined position, wherein the first holding section is movable between a first position and a second position, the contact section makes contact with the first holding section and is separated from the second holding section when the first holding section is positioned at the first position, and the contact section is separated from the first holding section and makes contact with the second holding section when the first holding section is positioned at the second position.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

DESCRIPTION OF THE PREFERRED EMBODIMENTS

Figure 1:
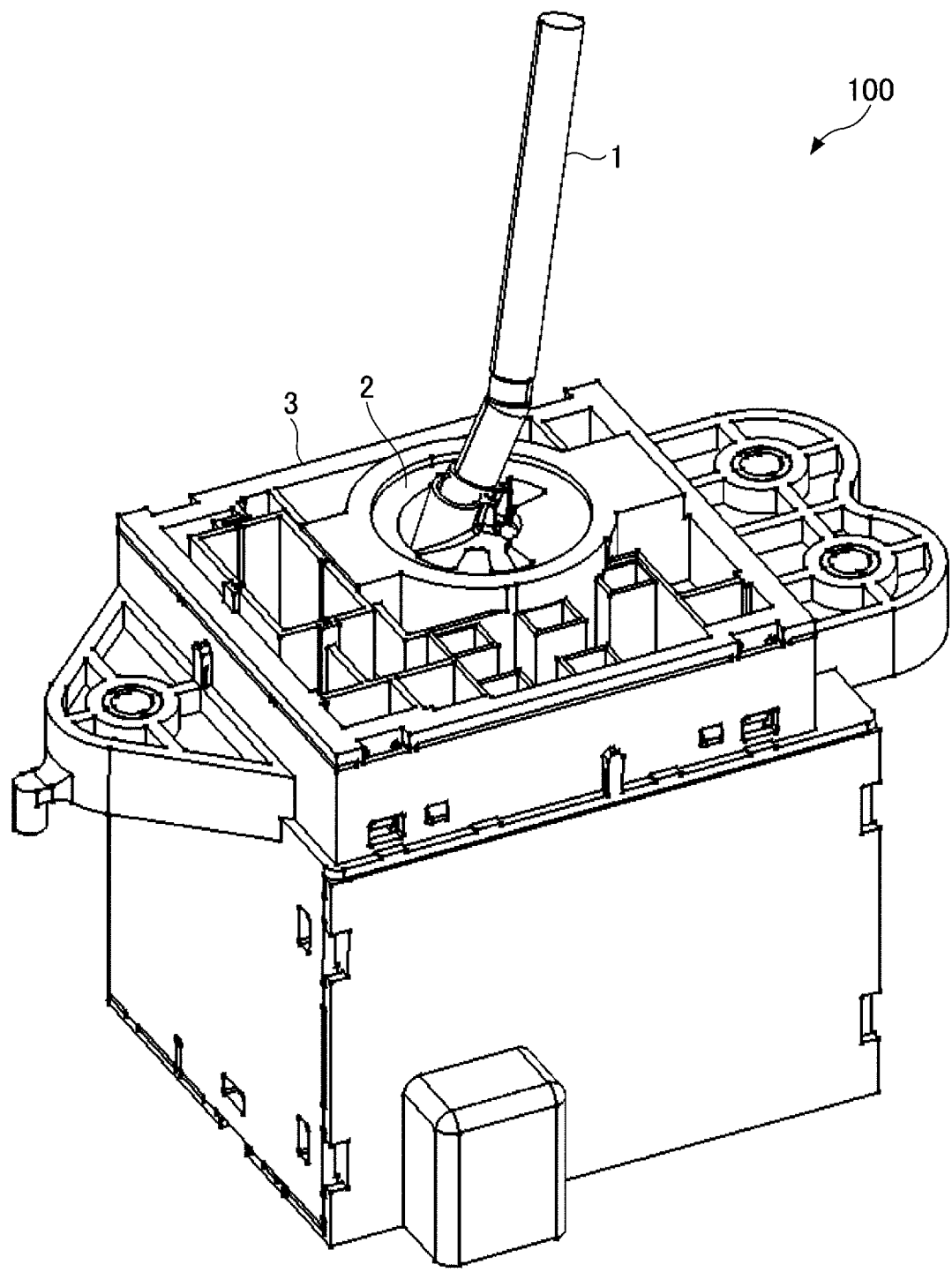
FIG. 1 is an external perspective view illustrating an example of an operating device.

Preferred embodiments of the present invention will be described in the following, by referring to the accompanying drawings. In the description of the specification and the drawings related to each embodiment, constituent elements having substantially the same functions or configurations will be designated by the same reference numerals, to omit repeating descriptions thereof. In addition, for the sake of convenience, although there are cases where directions are prescribed using an up-and-down direction, such cases are not intended to prescribe an installed state or a state of use of each embodiment, and the installation direction may be arbitrary as long as relative positional relationships are maintained.

An operating device 100 according to one embodiment will be described, by referring to FIG. 1 through FIG. 17. The operating device 100 is a device provided with a tiltable operating lever 1 that may be held at a plurality of positions. The operating device 100 may be applied to a shifting device, a stalk switch (or direction indicator), or the like of a vehicle. A description will be given for a case where the operating device 100 is the shifting device.

First, the structure of the operating device 100 will be described. FIG. 1 is an external perspective view illustrating an example of the operating device 100. The operating device 100 of FIG. 1 includes the operating lever 1, a socket 2, and a housing 3.

The operating lever 1 is a section that is operated by a user to switch gears of the vehicle, and corresponds to the so-called shift lever or select lever. The operating lever 1 is tiltable, and is held at a position according to the operation of the user, from among a plurality of positions respectively corresponding to different gears. A magnetic sensor or the like (not illustrated) provided inside the housing 3 detects the position where the operating lever 1 is positioned, and position detection information thereof is transmitted to a gear switching controller (not illustrated) of the vehicle. The user can switch the gear to a desired gear by moving the operating lever 1 to the position corresponding to the desired gear.

Figure 2:
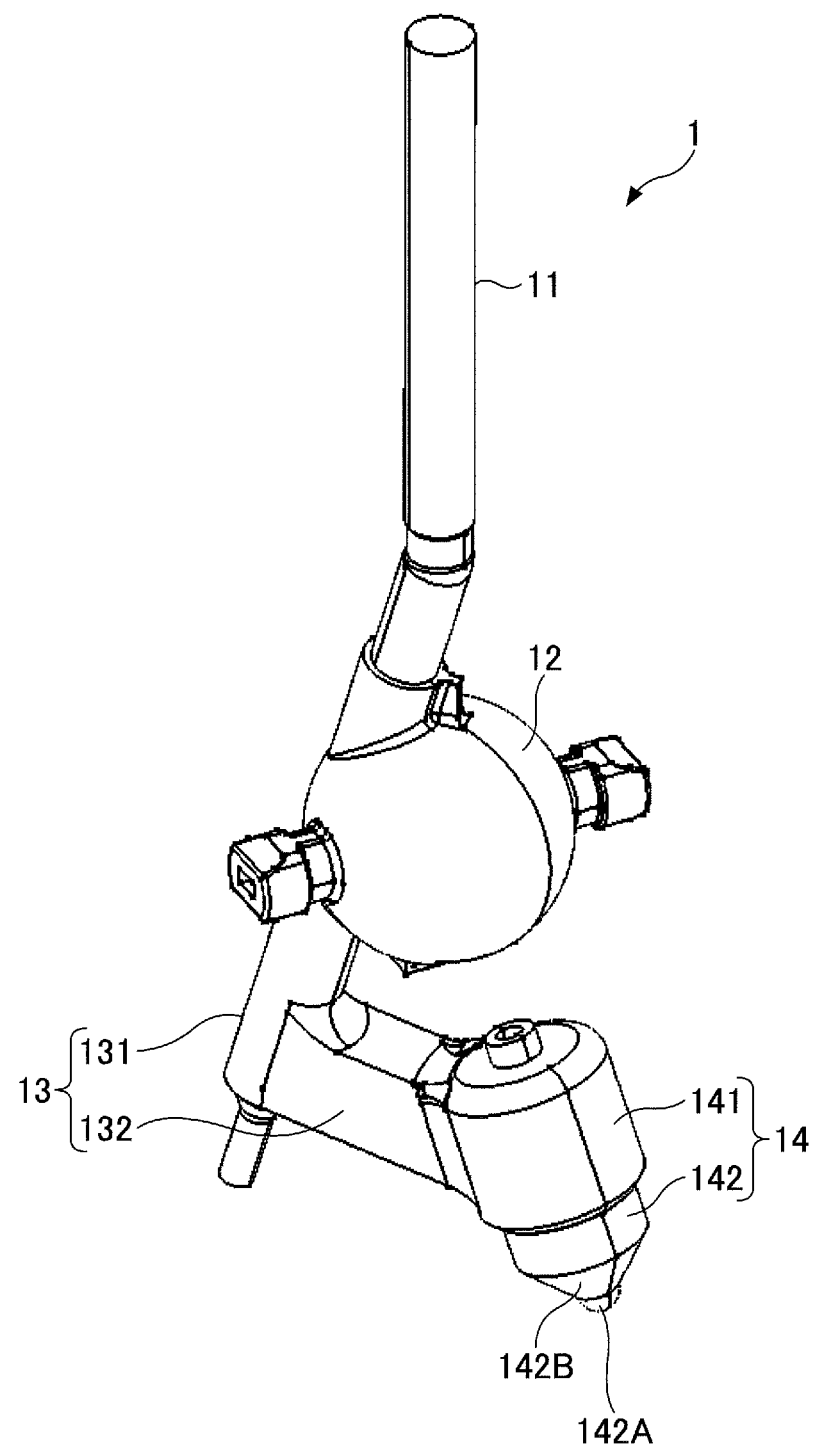
FIG. 2 is a perspective view illustrating an operating lever of FIG. 1.

FIG. 2 is a perspective view illustrating the operating lever 1 of FIG. 1. The operating lever 1 of FIG. 2 includes a shaft 11, a spherical section 12, a connecting section 13, and an actuator 14.

The shaft 11 is a tiltable rod-shaped member made of a metal. A section of the shaft 11 above the spherical section 12 (hereinafter simply referred to as an "upper section") is exposed to an outer side of the housing 3 from an upper surface of the socket 2. A knob may be provided on an upper end of the shaft 11 to facilitate gripping by the user.

The spherical section 12 is a spherical member made of a resin and fixed to the shaft 11. The spherical section 12 is arranged so that an axial direction (approximately the up-and-down direction in FIG. 2) of the upper section of the shaft 11 passes through a center of the spherical section 12, for example. The spherical section 12 forms a ball joint together with the socket 2. The shaft 11 is tiltably held by this ball joint. In other words, the spherical section 12 corresponds to a center of the tilt of the shaft 11.

The connecting section 13 is a member made of a resin and configured to connect the spherical section 12 and the actuator 14, and the connecting section 13 is fixed to the shaft 11. The spherical section 12, the connecting section 13, and a base section 141 of the actuator 14 to be described later, are formed integrally. The connecting section 13 includes a first section 131 that is fixed to the shaft 11, and a second section 132 that extends to a side from the first section 131.

The actuator 14 is a member made of a resin and configured to integrally tilt with the shaft 11, and the actuator 14 is provided on a tip end of the second section 132 of the connecting section 13. The actuator 14 includes the base section 141 that is hollow and provided on the tip end of the second section 132, and a contact section 142 that is hollow and fits into the base section 141.

The contact section 142 is a member that is movably held by the base section 141 and movable in the axial direction of the actuator 14 (approximately the up-and-down direction in FIG. 2), and the contact section 142 is urged (or biased) toward the outer side in the axial direction (that is, in a direction separating from the base section 141) by a compression coil spring that is provided on an inner side of the base section 141 and the contact section 142. The axial direction, that is a predetermined direction, is a direction passing through the center of the spherical section 12, for example, but is not limited to such a direction. When the user operates the operating lever 1 to tilt, the contact section 142 tilts integrally with the shaft 11, while contacting a first holding section 5 or a second holding section 6. The contact section 142 includes a first contact portion 142A that makes contact with the first holding section 5 and is provided on a tip end of the contact section 142, and a second contact portion 142B that makes contact with the second holding section 6 and is provided on a portion (or sloping portion) adjacent to the first contact portion 142A.

The socket 2 is a member that holds the spherical section 12, and is provided on an upper surface of the housing 3. As described above, the socket 2 forms the ball joint together with the spherical section 12. The socket 2 includes a through-hole that may be inserted with the shaft 11 of the operating lever 1.

The housing 3 has an approximately rectangular parallelepiped shape, and the socket 2 is provided on the upper surface of the housing 3. The housing 3 is fixed between two front seats of the vehicle, for example.

Figure 3:
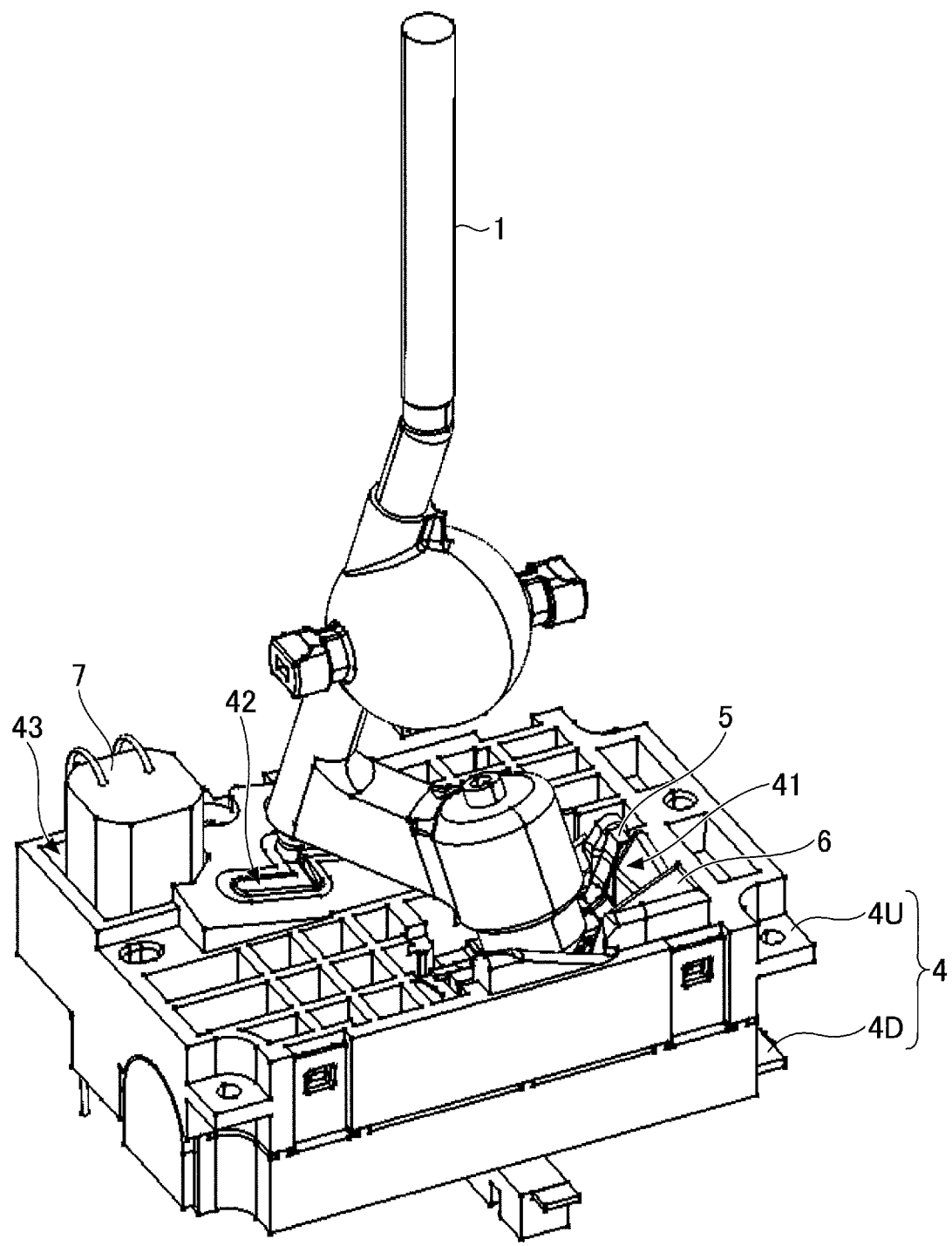
FIG. 3 is a perspective view illustrating an internal structure of the operating device of FIG. 1.

Next, an internal structure of the operating device 100 will be described. FIG. 3 is a perspective view illustrating the internal structure of the operating device 100 of FIG. 1. FIG. 3 corresponds to a diagram in which the housing 3 of FIG. 1 is omitted. As illustrated in FIG. 3, the operating device 100 includes, inside the housing 3, a casing 4, the first holding section 5, the second holding section 6, and a motor V.

The casing 4 is a member made of a resin and configured to hold an internal structure of the housing 3. The casing 4 has an approximately rectangular parallelepiped shape, and is fixed to the housing 3. The casing 4 includes an upper casing 4U forming an upper portion, and a lower casing 4D forming a lower portion. The upper casing 4D and the lower casing 4D are snap-fit and connected. A driving mechanism 8, that moves the first holding section 5 up and down, is provided on an upper surface of the lower casing 4D (that is, inside the casing 4), and on a lower surface of the lower casing 4D. The driving mechanism 8 will be described later.

Figure 4:
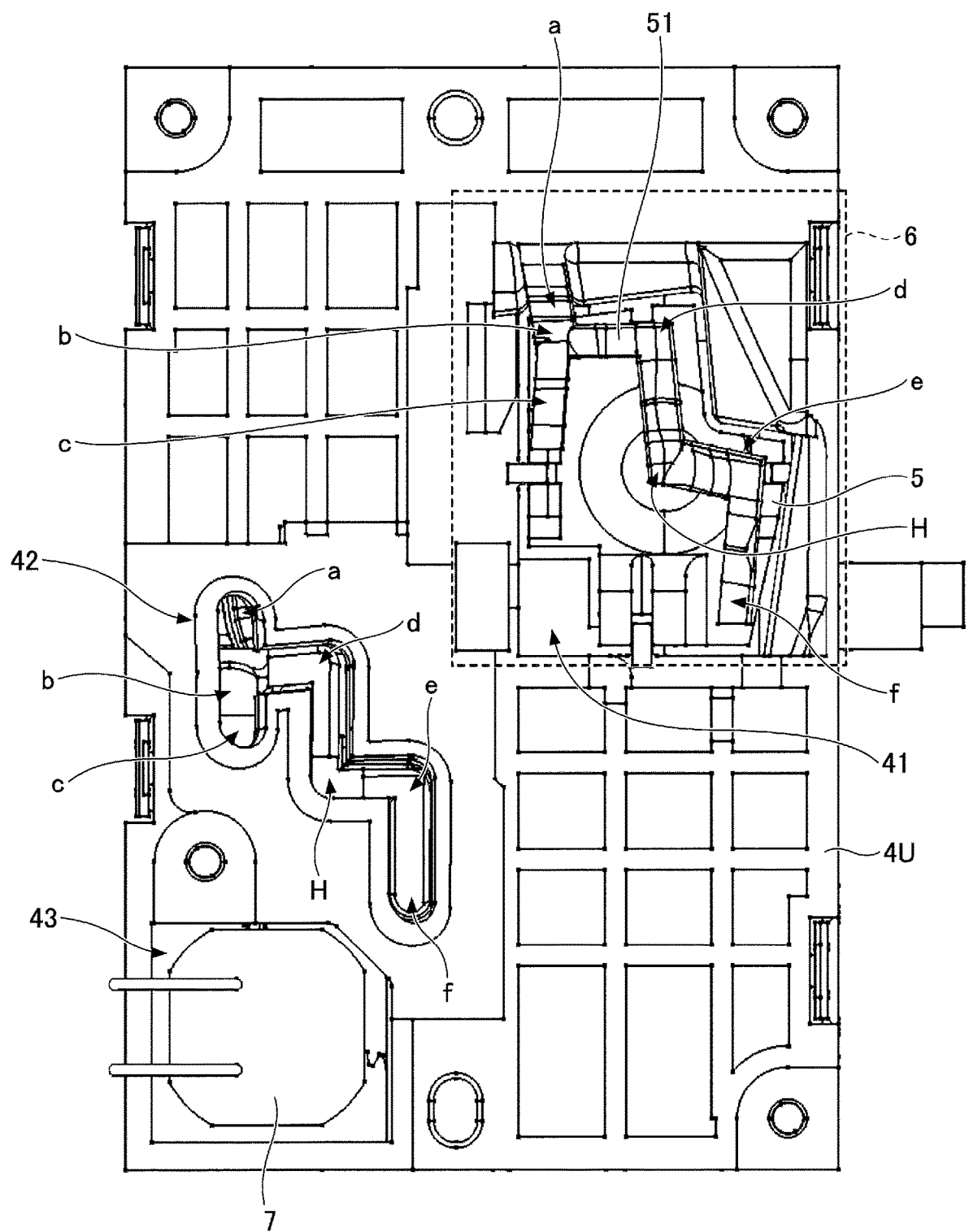
FIG. 4 is a plan view illustrating an upper casing of FIG. 3.

FIG. 4 is a plan view illustrating the upper casing 4U of FIG. 3. As illustrated in FIG. 4, the upper casing 4U includes the second holding section 6, an opening 41, a guide section 42, and an opening 43. The second holding section 6 will be described later.

The opening 41 is a through-hole formed in an upper surface of the upper casing 4U, and exposes the first holding section 5 at the upper surface of the upper casing 4U. The opening 41 has a planar shape that is approximately the same as a planar shape of the first holding section 5.

The guide section 42 is a through-hole formed in the upper surface of the upper casing 4U, and into which a lower end of the shaft 11 of the operating lever 1 is inserted, and this guide section 42 guides the tilt of the shaft 11. In other words, the shaft 11 tilts along the shape of the guide section 42. The guide section 42 has a plurality of positions respectively corresponding to the gears. In the example of the guide section 42 of FIG. 4, an upper end of a left column is "a", a center of the left column is "b", a lower end of the left column is "c", an upper end of a center column is "d", a lower end of the center column is "H" (Home), an upper end of a right column is "e", and a lower end of the right column is "f". "a" through "f" are respectively and suitably allocated to the gear positions such as "D" (Drive), "N" (Neutral), "R" (Reverse), or the like. In the following, a position corresponding to a gear X will be referred to as a X-position.

When the user operates the operating lever 1 to tilt, the gear of the vehicle is switched to the gear corresponding to the position where the lower end of the shaft 11 is positioned. For example, when the lower end of the shaft 11 is positioned at the d-position (upper end of the center column) of the guide section 42, the gear of the vehicle is switched to "d". The shape of the guide section 42, and the arrangement of the positions corresponding to each of the gears, are not limited to those of the example illustrated in FIG. 4.

The opening 43 is a through-hole formed in the upper surface of the upper casing 4U, and into which the motor 7 fixed to the lower casing 4D is inserted. In a case where the motor 7 can be accommodated inside the casing 4, the opening 43 does not need to be formed.

The first holding section 5 is a member made of a resin and configured to hold the contact section 142, and the first holding section 5 slides by making contact with the contact section 142 of the actuator 14, to generate a feeling of moderation. The first holding section 5 holds the contact section 142, to hold the position of the operating lever 1 that is operated and tilted. The first holding section 5 includes, on an upper surface thereof, a sliding path 51 having a shape corresponding to the guide section 42, and the contact section 142 makes sliding contact with the sliding path 51. The sliding path 51 includes a plurality of positions respectively corresponding to the gears. In the example of the first holding section 5 of FIG. 4, an upper end of a left column corresponds to "a", a center of the left column corresponds to "b", a lower end of the left column corresponds to "c", an upper end of a center column corresponds to "d", a lower end of the center column corresponds to "H", an upper end of a right column corresponds to "e", and a lower end of the right column corresponds to "f".

A recess that holds the contact section 142 making contact therewith, is formed at each of the positions of the first holding section 5. In other words, a projection is formed between each pair of adjacent positions of the first holding section 5. When the user operates the operating lever 1 to tilt, a feeling of operation (or feeling of moderation) is generated when the contact section 142 slides and rides over the recess and the projection. The user can easily recognize from this feeling of operation that the gear is switched.

The first holding section 5 is provided inside the casing 4 so that the first contact portion 142A at the tip end of the contact section 142 can make contact with the sliding path 51. More particularly, the first holding section 5 is provided inside the casing 4, so that the sliding path 51 is exposed at the upper surface of the upper casing 4U. In addition, the sliding path 51 is formed on the first holding section 5, and the first holding section 5 is arranged inside the casing 4, so that the gear corresponding to the position where the lower end of the shaft 11 is positioned matches the gear corresponding to the position where the contact section 142 makes contact with the sliding path 51.

Figure 5:
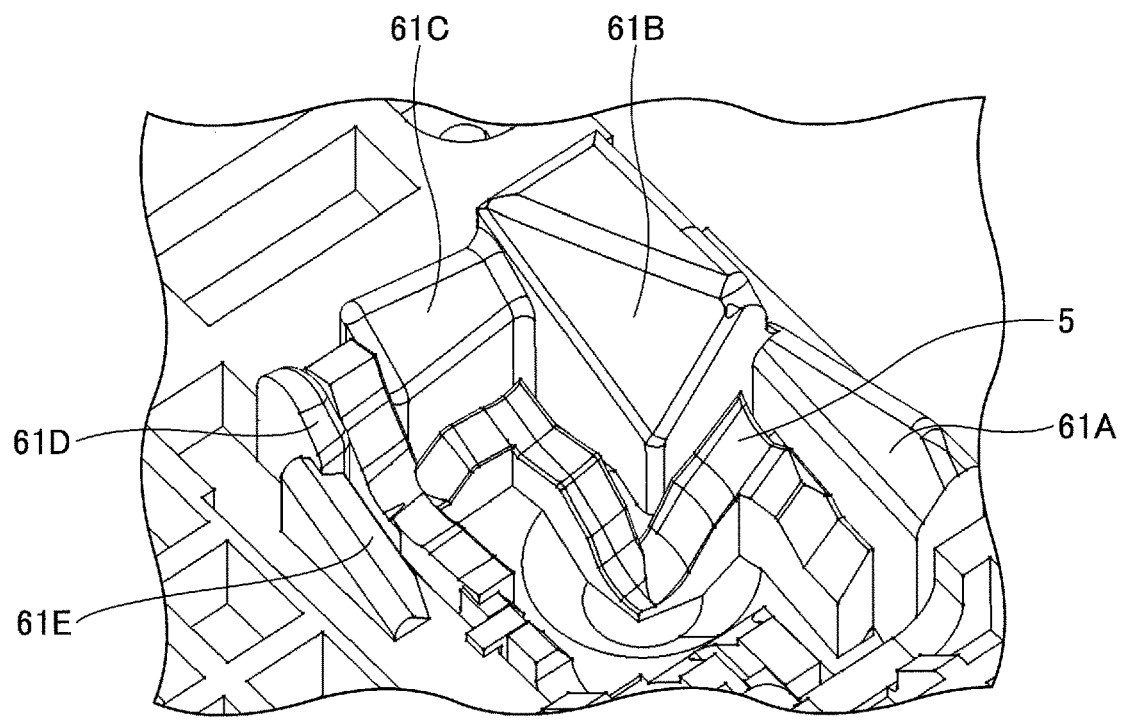
FIG. 5 is a partial enlarged diagram of a first holding section positioned at a hold position.

In addition, the first holding section 5 moves between a hold position (or first position) and a return position (or second position). FIG. 5 is a partial enlarged diagram of the first holding section 5 positioned at the hold position, and FIG. 6 is a partial enlarged diagram of the first holding section 5 positioned at the return position.

Figure 6:
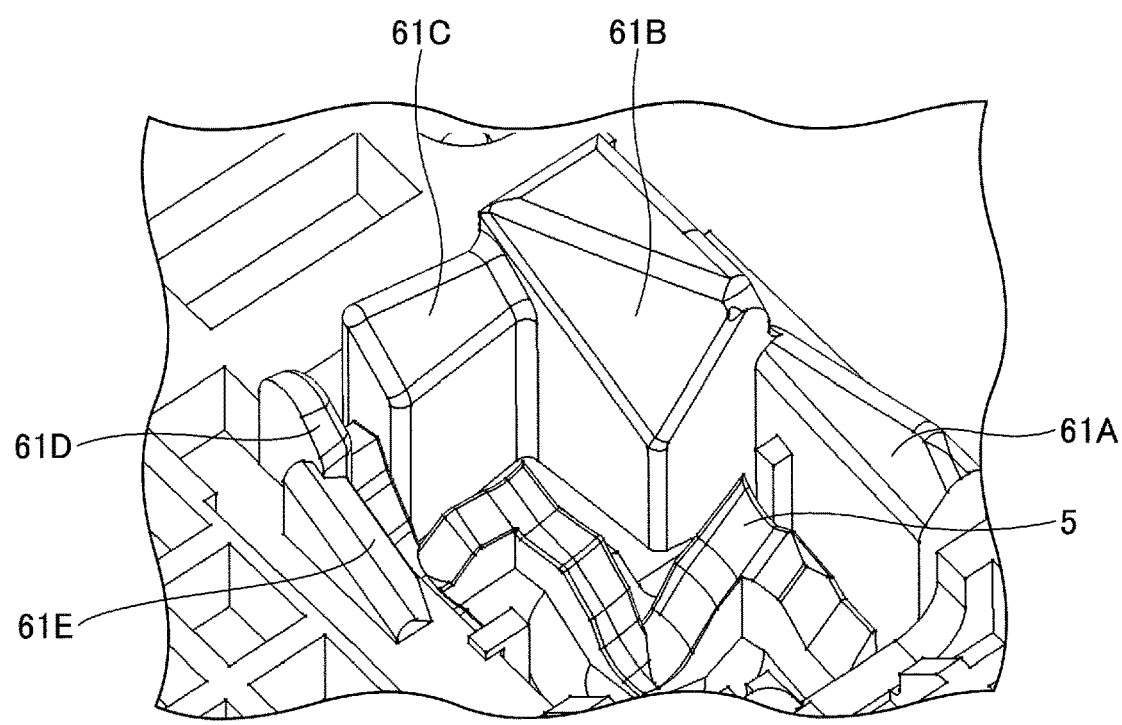
FIG. 6 is a partial enlarged diagram of the first holding section positioned at a return position.

As illustrated in FIG. 5 and FIG. 6, the hold position is a position, that is located above the return position, and where the first holding section 5 makes contact with the contact section 142. In a case where the first holding section 5 is positioned at the hold position, the contact section 142 makes contact with the recess of the first holding section 5 in a state where the first contact portion 142A of the contact section 142 is biased, and the contact section 142 can be held to the position to where the operating lever 1 is tilted by being operated. In this case, the second holding section 6 separates from (that is, does not make contact with) the contact section 142.

On the other hand, the return position is a position, that is located below the hold position, and where the first holding section 5 separates from the contact section 142. In a case where the first holding section 5 is positioned at the return position, the first holding section 5 is separated from (that is, does not make contact with) the contact section 142.

The second holding section 6 is a member made of a resin, provided so as to surround an outer periphery of the first holding section 5. In a case where the first holding section 5 moves from the hold position to the return position, the contact section 142 that is biased by a biasing force of the compression coil spring moves further in the predetermined direction, such that the second contact portion 142B of the contact section 142 can make contact with the second holding section 6. Hence, the contact section 142 is guided to a predetermined position, and held at the predetermined position. In the example illustrated in FIG. 4, the predetermined position is the H-position, however, the predetermined position is not limited to the H-position.

The second holding section 6 is famed, integrally with the upper casing 4, on the upper surface of the upper casing 4U. The second holding section 6 includes sloping surfaces 61A through 61E. When not distinguishing the sloping surfaces 61A through 61E from one another, these sloping surfaces will be referred to as sloping surfaces 61. The sloping surface 61 is provided at a peripheral edge portion of the opening 41, and is formed so that the second contact portion 142B of the contact section 142, making contact with the sloping surface 61, moves from the position held by the biasing force of the compression coil spring to the predetermined position.

More particularly, the sloping surface 61A moves the contact section 142 positioned at the f-position to the e-position. The sloping surface 61B moves the contact section 142 positioned at the d-position or the e-position to the H-position, and holds the contact section 142 at the H-position. The sloping surface 61C moves the contact section 142 positioned at the b-position to the d-position. The sloping surface 61D moves the contact section 142 positioned at the a-position to the b-position. The sloping surface 61E moves the contact section 142 positioned at the c-position to the b-position.

When the first holding section 5 is positioned at the hold position, the contact section 142 is held at the recess corresponding to one of the positions after the first holding section 5 is operated and tilted. When the first holding section 5 moves from the hold position to the return position, the contact section 142 separates from the first holding section 5, and moves to make contact with the sloping surface 61 that is provided on the outer periphery of the first holding section 5 due to the biasing force of the compression coil spring, and is guided by the sloping surface 61 and moves to the predetermined position due to the biasing force of the compression coil spring. When the contact section 142 moves to the predetermined position, the contact section 142 is held at the predetermined position in a state making contact with the sloping surface 61.

The motor 7 is a driving source configured to drive the driving mechanism 8. The motor 7 is fixed to the lower casing 4D. The motor 7 rotates according to a control signal from an external control circuit (ECU (Electronic Control Unit) or the like), to drive the driving mechanism 8. The control circuit may be included in the operating device 100.

Figure 7:
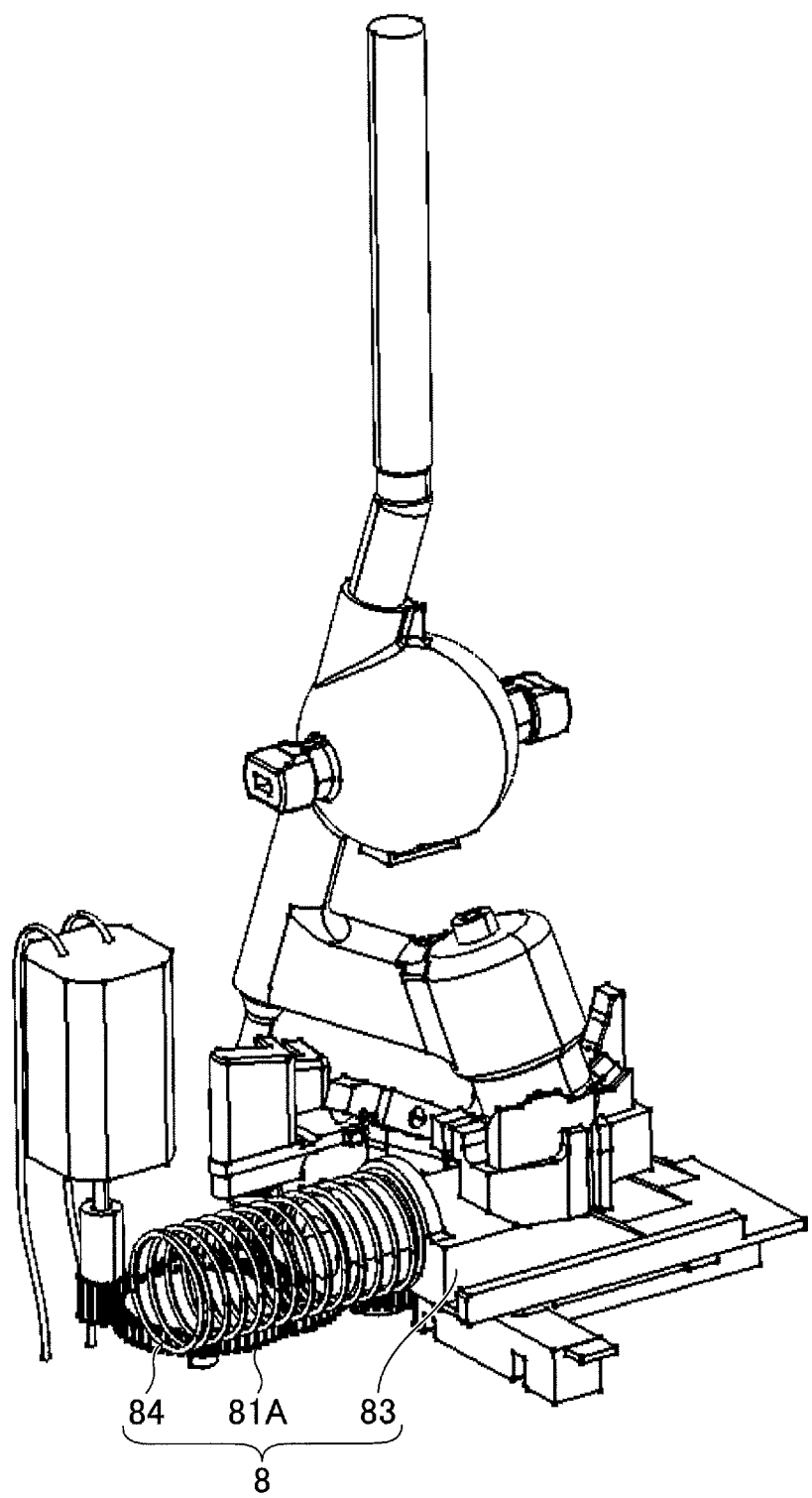
FIG. 7 is a perspective view illustrating an internal structure of a casing.
Figure 8:
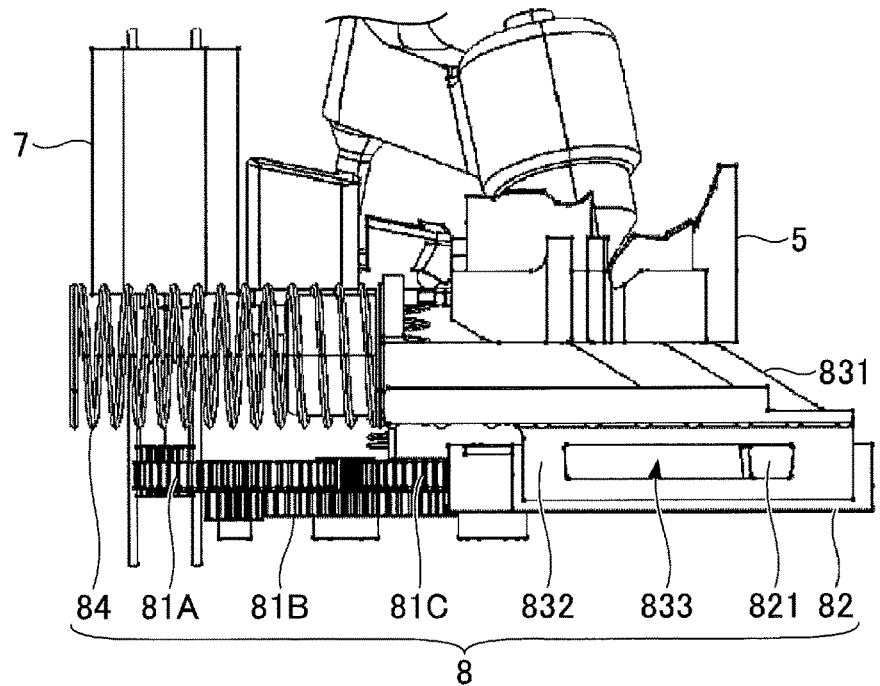
FIG. 8 is a front view illustrating a driving mechanism of FIG. 7.
Figure 9:
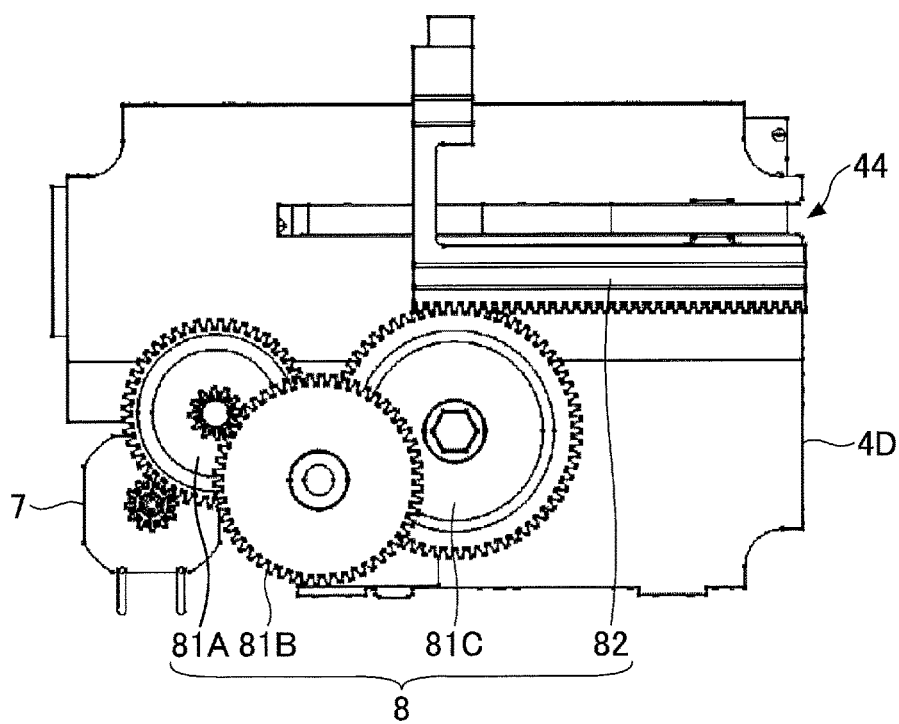
FIG. 9 is a bottom view of FIG. 3.

Next, the driving mechanism 8 will be described. FIG. 7 is a perspective view illustrating an internal structure of the casing 4. FIG. 7 corresponds to a diagram in which the casing 4 of FIG. 3 is omitted. FIG. 8 is a front view illustrating the driving mechanism 8 of FIG. 7. FIG. 9 is a bottom view of FIG. 3. In the following description, a direction viewed from the first holding section 5 toward a biasing section 84 will be referred to as the left direction, and a direction viewed from the biasing section 84 toward the first holding section 5 will be referred to as the right direction.

The driving mechanism 8 is a mechanism configured to move the first holding section 5 between the hold position and the return position. As illustrated in FIG. 7 through FIG. 9, the driving mechanism 8 includes gears 81A through 81C, a rack 82, a sliding section 83, and the biasing section 84. In the following, when not distinguishing the gears 81A through 81C from one another, these gears will be referred to as gears 81. The position of each component, such as the rack 82 or the like, moved by the motor 7, may be detected by a detection means (mechanical switch, optical sensor, magnetic sensor, or the like) that is not illustrated and detects the position of each component directly. Alternatively, the position of each component may be computed from a reference position of each component, and a number of rotations of the motor 7 rotated in a moving direction. In addition, the above-mentioned control circuit may control rotation start and rotation stop timings, a rotating direction, a velocity, or the like of the motor 7.

The gears 81A through 81C are provided on the lower surface of the lower casing 4D in a state where the gears 81A through 81C mesh one another, and reduce the rotation of the motor 7 to transmit the rotation to the rack 82 in a state where a driving force is amplified. The number of gears 81 is not limited to 3.

The rack 82 is provided on the lower surface of the lower casing 4D, and is slidable in the left and right directions in a state where the rack 82 meshes with the gear 81C (or pinion gear). When the motor 7 rotates, the rack 82 slides in the left and right directions according to the rotation of the motor 7 by the principle of the so-called rack-and-pinion mechanism. As illustrated in FIG. 8, the rack 82 includes a projection 821 that projects in a direction perpendicular to the moving direction of the rack 82.

The sliding section 83 is a member that moves the first holding section 5 between the hold position and the return position, by sliding in the left and right directions. The sliding section 83 has a lower surface that is slidable in the left and right direction on the upper surface of the lower casing 4D. The sliding section 83 includes an elevator section 831 configured to raise and lower the first holding section 5, and a connecting section 832 that is provided to project downward from a lower surface of the elevator section 831. As illustrated in FIG. 8, the connecting section 832 includes an opening 833 into which the projection 821 of the rack 82 is inserted.

When the motor 7 rotates and the rack 82 slides in the left and right directions, the projection 821 presses against an inner wall of the opening 833 at the left and right thereof, to move the connecting section 832 in the left and right directions. As illustrated in FIG. 9, the lower casing 4D is provided with a groove section 44 in which the connecting section 832 slides.

The biasing section 84 has a left end fixed to a side surface of the lower casing 4D, and a right end fixed to a left end of the elevator section 831, and urges the elevator section 831 toward the right direction. The biasing section 84 is a compression coil spring, for example, but is not limited to the compression coil spring.

Next, the first holding section 5 and the sliding section 83 will be described. FIG. 10 through FIG. 13 are partial enlarged views of the first holding section 5 and the sliding section 83. In the example illustrated in FIG. 10 and FIG. 11, the first holding section 5 is positioned at the hold position. In the example illustrated in FIG. 12 and FIG. 13, the first holding section 5 is positioned at the return position.

Figure 10:
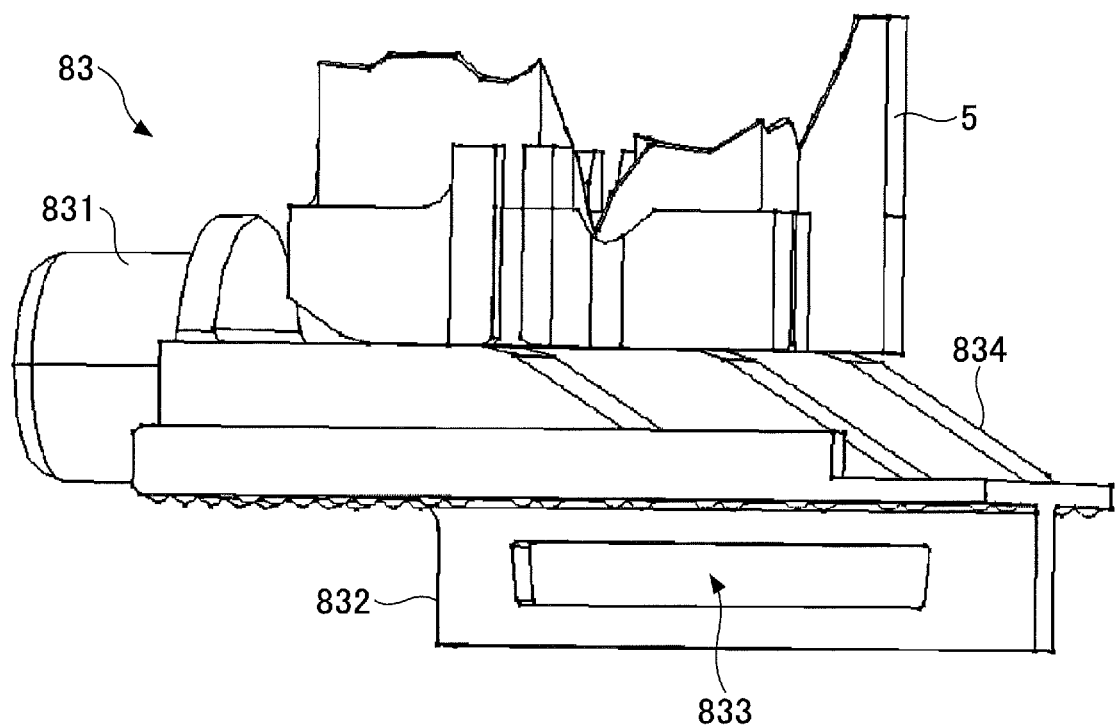
FIG. 10 is a partial enlarged view of the first holding section and a sliding section.
Figure 11:
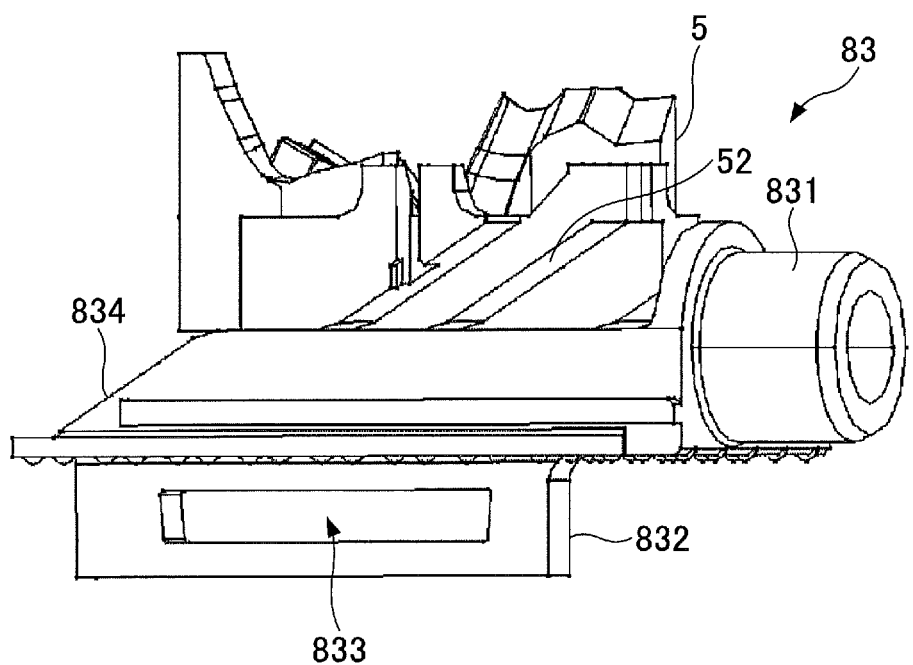
FIG. 11 is a partial enlarged view of the first holding section and the sliding section.

As illustrated in FIG. 10 through FIG. 13, the elevator section 831 includes an upper surface and the lower surface that are horizontal and flat, and has an approximately trapezoidal shape including a sloping section 834 on a right end of the elevator section 831. The sloping section 834 has a sloping shape extending at a predetermined inclination from the lower surface to the upper surface of the elevator section 831. As illustrated in FIG. 11, the first holding section 5 includes a sloping section 52 at a right end (left end in FIG. 10) on the lower surface of the first holding section 5. The sloping section 52 has an inclination that is approximately parallel to the sloping shape of the sloping section 834. The upper surface of the elevator section 831 opposes the lower surface of the first holding section 5 at the hold position, and the sloping section 834 opposes the sloping surface 52 of the first holding section 5 when the first holding section 5 is raised and lowered.

As described heretofore, because the outer periphery of the first holding section 5 is surrounded by the second holding section 6, the first holding section 5 cannot move in the left and right directions, and can only move in the up and down directions. Accordingly, when the sliding section 83 moves in the left direction in FIG. 10 from a state where the first holding section 5 illustrated in FIG. 10 and FIG. 11 is positioned at the hold position, the first holding section 5 is lowered from the upper surface to the lower surface of the elevator section 831, while causing the sloping section 52 of the first holding section 5 to oppose the sloping section 834 of the sliding section 83. As a result, the first holding section 5 moves from the hold position to the return position.

Figure 12:
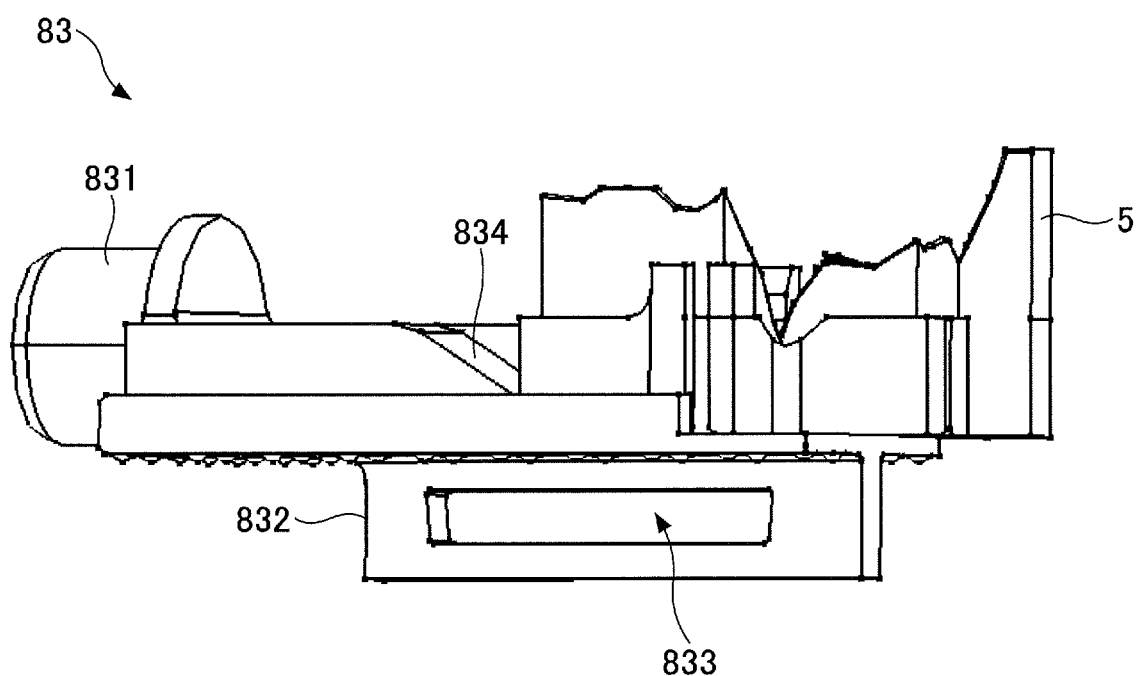
FIG. 12 is a partial enlarged view of the first holding section and the sliding section.
Figure 13:
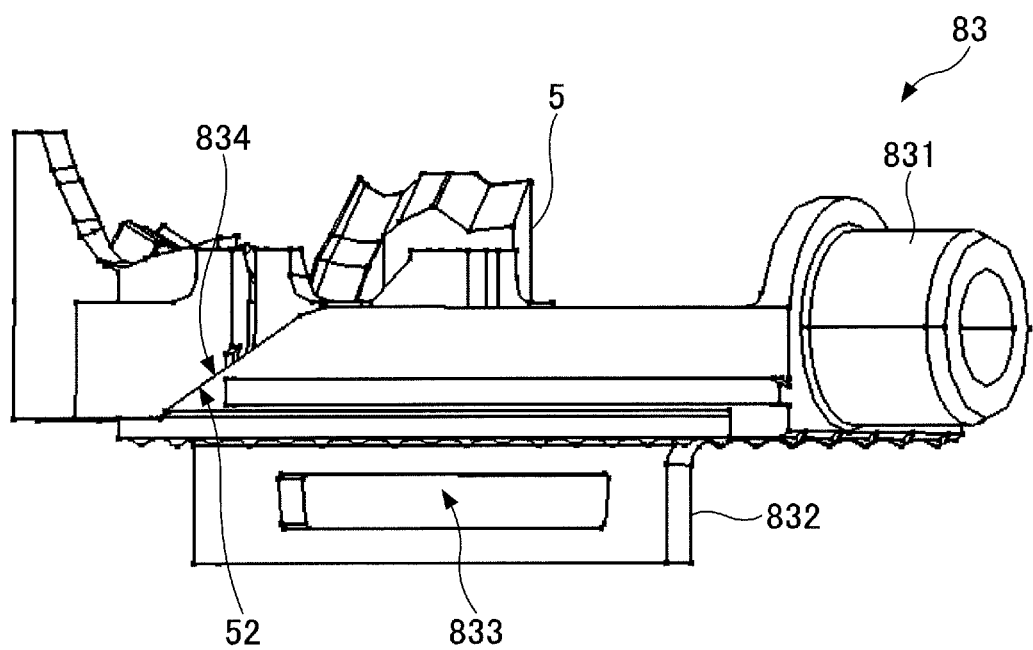
FIG. 13 is a partial enlarged view of the first holding section and the sliding section.

On the other hand, when the sliding section 83 moves in the right direction in a state where the first holding section 5 is positioned at the return position illustrated in FIG. 12 and FIG. 13, a process in reverse to the process described above is performed, and the first holding section 5 is raised from the lower surface to the upper surface of the elevator section 831, while causing the sloping section 52 of the first holding section 5 to oppose the sloping section 834 of the sliding section 83. As a result, the first holding section 5 moves from the return position to the hold position, as illustrated in FIG. 10 and FIG. 11.

In the examples illustrated in FIG. 10 through FIG. 13, the sloping sections 52 and 834 are formed by 3 rows of slopes having start positions thereof deviated in a horizontal direction. However, the number of rows of the slopes may be designed arbitrarily. In addition, inclination angles of the sloping sections 52 and 834 may be designed arbitrarily.

Next, an operation of the operating device 100 will be described. In this embodiment, during operation of a driving-motor (engine or motor) of the vehicle that is not illustrated, the first holding section 5 is positioned at the hold position. In other words, the rack 82 and the sliding section 83 are positioned at the right end of respective movable ranges and corresponding to the hold position, and the first holding section 5 is positioned on the upper surface of the elevator section 831. Hence, during operation of the driving-motor of the vehicle, the contact section 142 generates a feeling of operation according to the operation of the user to tilt the operating lever 1, and the first holding section 5 is held at the position (recess) to where the operating lever 1 is operated and tilted.

Figure 14:
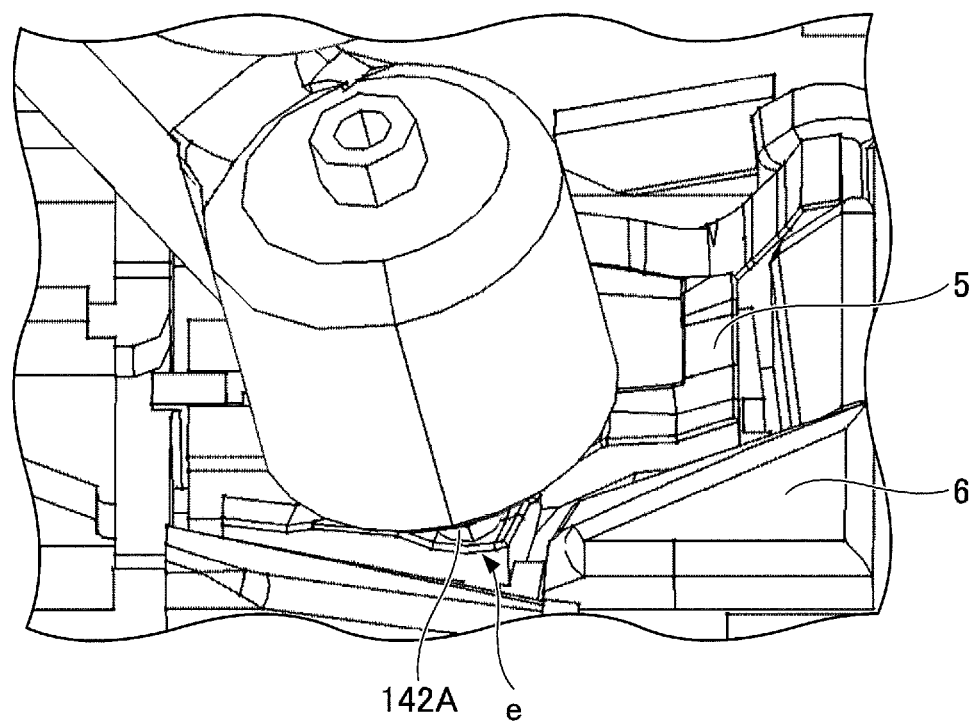
FIG. 14 is a partial enlarged view illustrating a contact section held at an e-position of the first holding section.

FIG. 14 is a partial enlarged view illustrating the contact section 142 held at the e-position of the first holding section 5. As illustrated in FIG. 14, when the first holding section 5 is positioned at the hold position, the contact section 142 does not make contact with the second holding section 6, and the first contact portion 142A is contacted and held by the first holding section 5.

Thereafter, during stop operation of the driving-motor of the vehicle, the controller performs a return control of the operating lever 1. More particularly, the controller supplies power for return control to the motor 7, to rotate the motor 7 in a predetermined direction. During the stop operation of the driving-motor, refers to a time simultaneous as the stop operation, or a time after a predetermined time elapses from the stop operation, using the stop operation as a trigger.

Figure 15:
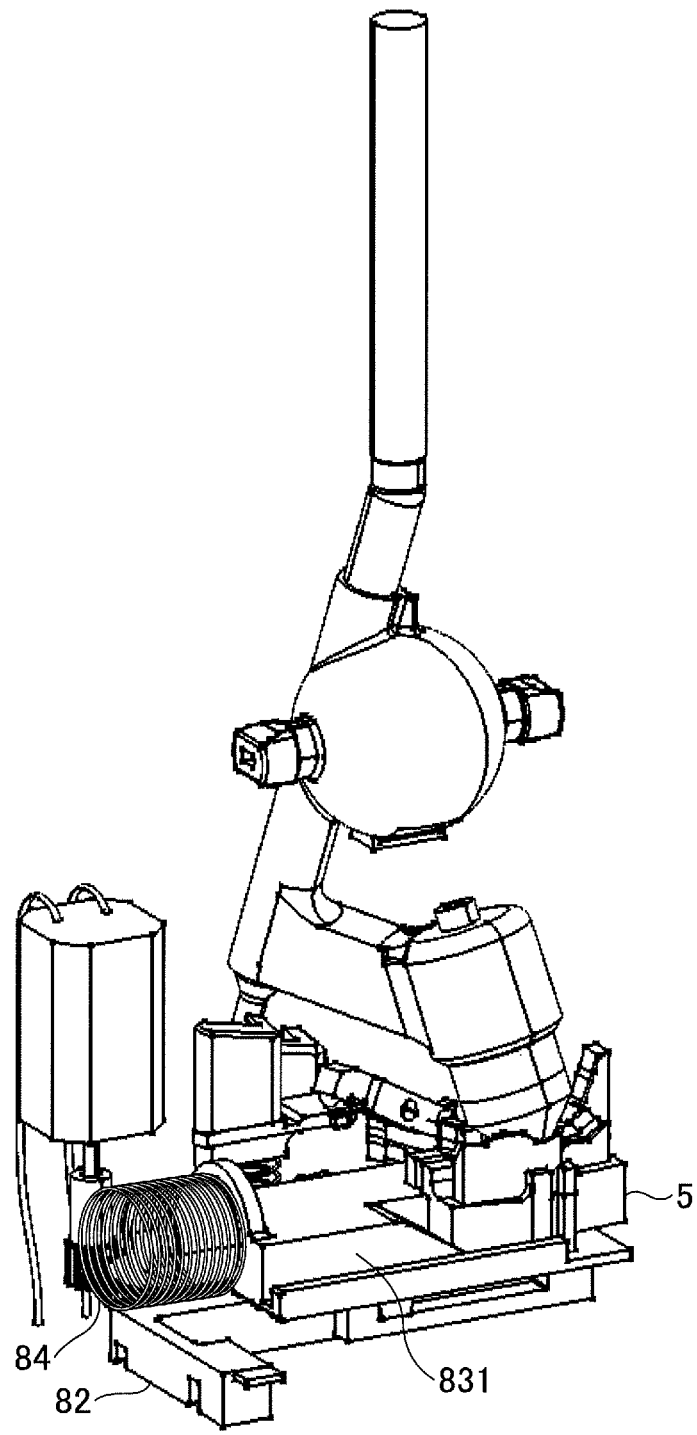
FIG. 15 is a perspective view illustrating the internal structure of the casing.

When the motor 7 rotates, the rotation of the motor 7 is transmitted to the rack 82 through the gears 81A through 81C, and the rack 82 moves in the left direction. When the rack 82 moves in the left direction, the projection 821 presses against the inner wall of the opening 833 at the left thereof, to move the connecting section 832 in the left direction. FIG. 15 is a perspective view illustrating the internal structure of the casing 4. In a case where the connecting section 832 moves in the left direction, the elevator section 831 also moves to the left of the movable range thereof while sliding against the first holding section 5, and the first holding section 5 moves to the position on the lower surface from the upper surface of the elevator section 831, to move to the return position illustrated in FIG. 15. In this case, the contact section 142 moves in the axial direction according to the lowering of the first holding section 5 due to the biasing force of the internal compression coil spring, and the second contact portion 142B makes contact with the second holding section 6 in a state where the position of the contact section 142 is maintained at the e-position. Further, in this case, a moving amount of the first holding section 5 that is lowered is set larger than a moving amount of the contact section 142 in the axial direction, and the contact section does not make contact with the first holding section 5 even after moving in the axial direction.

Figure 16:
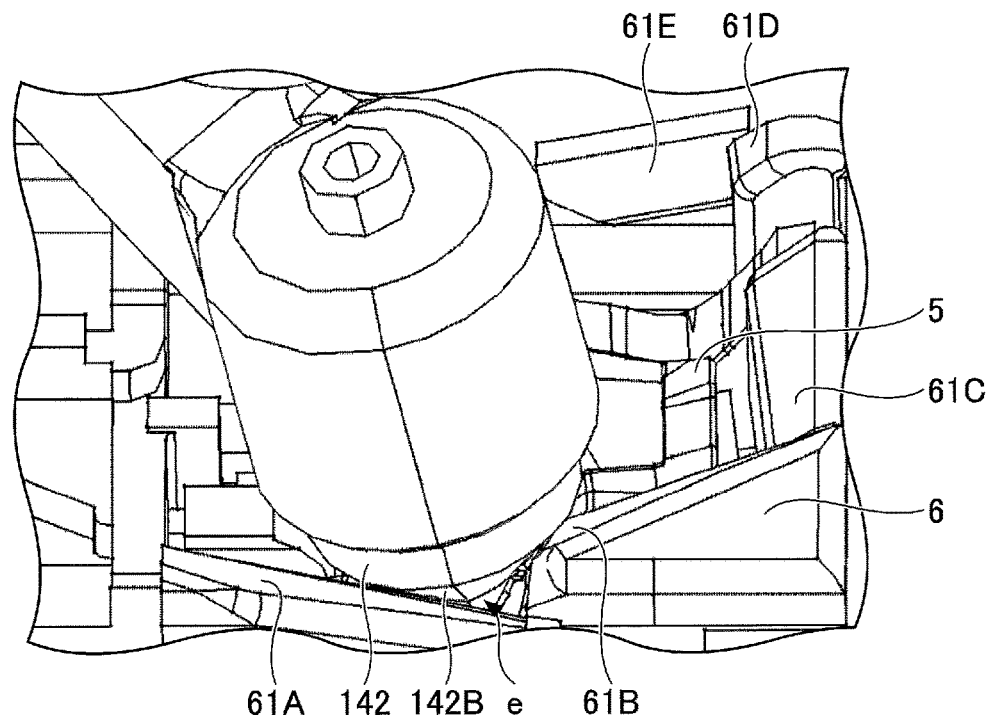
FIG. 16 is a partial enlarged view illustrating the contact section contacting a second holding section at the e-position.

FIG. 16 is a partial enlarged view illustrating the contact section 142 contacting the second holding section 6 at the e-position. As illustrated in FIG. 16, when the first holding section 5 is lowered, the contact section 142 does not make contact with the first holding section 5, and the second Contact portion 142B makes contact with the second holding section 6. In the example illustrated in FIG. 16, the second contact portion 142B of the contact section 142 makes contact with the sloping surfaces 61A and 61B.

When the second contact portion 142B of the contact section 142 extends in the axial direction and makes contact with the second holding section 6 due to the biasing force of the internal compression coil spring, the second contact portion 142B moves to the H-position along the sloping surface 61 of the second holding section 6, due to a reaction force with respect to the biasing force of the compression coil spring. In other words, the second contact portion 142B of the contact section 142 is guided to the H-position by the sloping surface 61 of the second holding section 6. When the contact section 142 moves to the H-position, the operating lever 1 is held at the H-position by the second holding section 6, in a state where the second contact portion 142B makes contact with the sloping surface 61.

Figure 17:
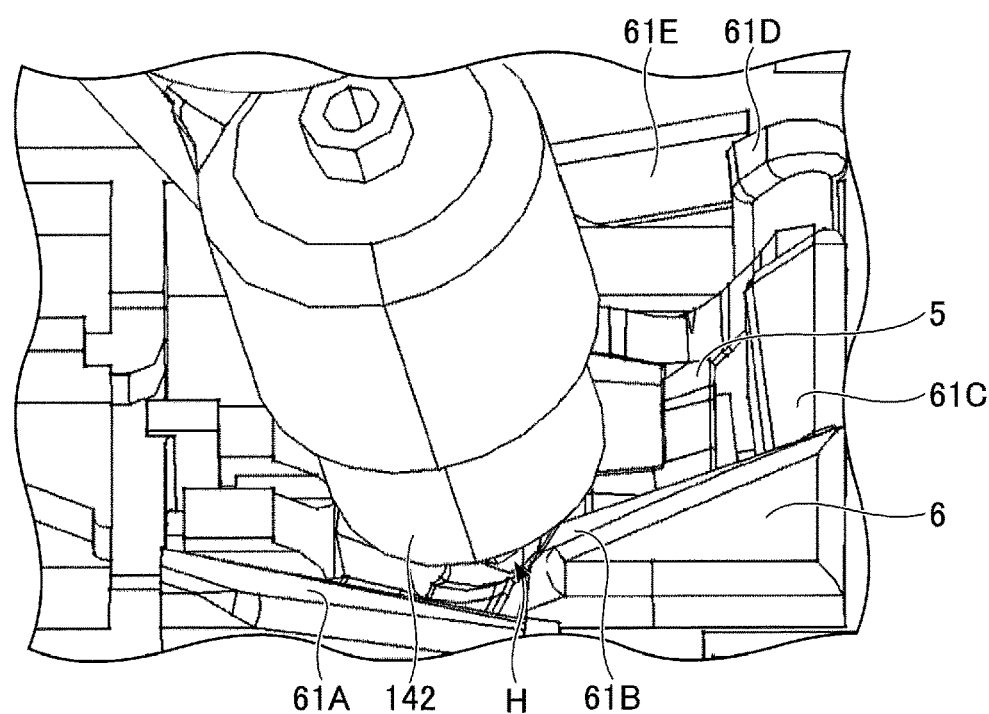
FIG. 17 is a partial enlarged view illustrating the contact section held by the second holding section at a H-position.

FIG. 17 is a partial enlarged view illustrating the contact section 142 held by the second holding section 6 at the H-position. As illustrated in FIG. 17, the contact section 142 is held at the H-position by the second holding section 6, in a state where the contact section 142 extends in the axial direction. In the example illustrated in FIG. 17, the second contact portion 142B of the contact section 142 is held in a state where the second contact portion 142B makes contact with the sloping surface 61B.

As described heretofore, according to this embodiment, during the stop operation of the driving-motor of the vehicle, the first holding section 5 moves from the hold position to the return position, so that the contact section 142 is guided by the second holding section 6 and automatically moved to the H-position. In other words, the operating lever 1 is automatically returned to the H-position.

Hence, the operating device 100 according to this embodiment can return the shaft 11 to the H-position by merely moving the first holding section 5 in the up and down directions. According to this embodiment, it is possible to reduce the dynamic force of the motor 7 required to return the operating lever 1 to the return position, when compared to the conventional operating device that moves the shaft 11 directly.

In addition, according to this embodiment, sliding contact noise is generated between the contact section 142 and the second holding section 6 when returning the operating lever 1. But because the contact section 142 and the second holding section 6 are resin members, this sliding contact noise is small when compared to the sound that is generated in the conventional operating device in which the member for moving the metal shaft collides with the metal shaft. For this reason, according to this embodiment, the sound that is generated when the operating lever 1 is returned can be made small.

Further, according to this embodiment, the first holding section 5 and the second holding section 6 are separate members. Consequently, the first holding section 5 and the second holding section 6 can be designed separately, and the shape and the material used for the first holding section 5 and the second holding section 6 can respectively employ the optimum design. As a result, it is possible to improve the feeling of operation, such as the level of feeling of moderation or the like, of the operating device 100, and to improve the design accuracy of the sliding path 51 and the sloping surface 61.

According to each embodiment of the present invention, it is possible to reduce the dynamic force required to return the operating lever.

The present invention is not limited to the structures or the like of the embodiments illustrated above, and combinations with other elements may be made. In this respect, all examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An operating device comprising:
   a shaft operated to tilt;
   a contact section, held on the shaft in a biased state movable in a predetermined direction, and tiltable integrally with the shaft operated to tilt;
   a first holding section, configured to generate a feeling of moderation by sliding against the contact section, and including a plurality of recesses that hold the contact section at positions to where the shaft is operated to tilt; and
   a second holding section configured to make contact with the contact section, guide the contact section to a predetermined position from the positions to where the shaft is operated to tilt, and hold the contact section at the predetermined position, wherein
   the first holding section is movable between a first position and a second position,
   the contact section makes contact with the first holding section and is separated from the second holding section when the first holding section is positioned at the first position, and
   the contact section is separated from the first holding section and makes contact with the second holding section when the first holding section is positioned at the second position.

2. The operating device as claimed in claim 1, wherein the second holding section is provided to surround an outer periphery of the first holding section.

3. The operating device as claimed in claim 2, wherein the second holding section includes a sloping surface that is formed to cause the contact section, biased in the predetermined direction by a biasing force, to move to the predetermined position.

4. The operating device as claimed in claim 3, wherein
   the contact section is biased in the predetermined direction by the biasing force toward each of the plurality of recesses of the first holding section or the sloping surface of the second holding section,
   the contact section includes, on a tip end thereof, a first contact portion configured to make contact with each of the plurality of recesses of the first holding section, and
   the contact section includes, at a portion adjacent to the first contact portion, a second contact portion configured to make contact with the sloping surface of the second holding section.

5. The operating device as claimed in claim 4, wherein the contact section and the second holding section are respectively made of a resin material.

6. The operating device as claimed in claim 1, wherein the second holding section includes a sloping surface that is formed to cause the contact section, biased in the predetermined direction by a biasing force, to move to the predetermined position.

7. The operating device as claimed in claim 6, wherein
   the contact section is biased in the predetermined direction by the biasing force toward each of the plurality of recesses of the first holding section or the sloping surface of the second holding section,
   the contact section includes, on a tip end thereof, a first contact portion configured to make contact with each of the plurality of recesses of the first holding section, and
   the contact section includes, at a portion adjacent to the first contact portion, a second contact portion configured to make contact with the sloping surface of the second holding section.

8. The operating device as claimed in claim 7, wherein the contact section and the second holding section are respectively made of a resin material.

9. The operating device as claimed in claim 1, further comprising:
   a driving mechanism configured to move the first holding section between the first position and the second position.

10. The operating device as claimed in claim 9, further comprising:
    a motor configured to drive the driving mechanism.

11. The operating device as claimed in claim 1, wherein the first holding section is positioned at the first position during operation of a driving-motor of a vehicle, and moves to the second position during stop operation of the driving-motor.

12. The operating device as claimed in claim 1, further comprising:
    a housing accommodating the first holding section, and the second holding section,
    wherein the first holding section is positioned at the first position during operation of a driving-motor of a vehicle to which the operating device is fixed, and moves to the second position during stop operation of the driving-motor.

13. The operating device as claimed in claim 1, wherein the first holding section and the second holding section are formed by separate members.

* * * * *